US009590457B2

(12) United States Patent
Hattori

(10) Patent No.: US 9,590,457 B2
(45) Date of Patent: Mar. 7, 2017

(54) STATOR OF A ROTARY ELECTRIC MACHINE

(71) Applicant: Hiroyuki Hattori, Okazaki (JP)

(72) Inventor: Hiroyuki Hattori, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 316 days.

(21) Appl. No.: 14/410,910

(22) PCT Filed: Jul. 3, 2013

(86) PCT No.: PCT/IB2013/001427
§ 371 (c)(1),
(2) Date: Dec. 23, 2014

(87) PCT Pub. No.: WO2014/020385
PCT Pub. Date: Feb. 6, 2014

(65) Prior Publication Data
US 2015/0188366 A1 Jul. 2, 2015

(30) Foreign Application Priority Data

Aug. 1, 2012 (JP) ................. 2012-170943

(51) Int. Cl.
H02K 1/00 (2006.01)
H02K 1/16 (2006.01)
H02K 3/16 (2006.01)
H02K 3/00 (2006.01)
H02K 1/27 (2006.01)
H02K 29/03 (2006.01)

(52) U.S. Cl.
CPC ............... *H02K 1/16* (2013.01); *H02K 1/165* (2013.01); *H02K 3/00* (2013.01); *H02K 3/16* (2013.01); *H02K 1/276* (2013.01); *H02K 29/03* (2013.01)

(58) Field of Classification Search
CPC ......... H02K 21/04; H02K 21/44; H02K 37/20
USPC .......... 310/181, 152, 154.11, 154.06, 154.22
See application file for complete search history.

(56) References Cited

U.S. PATENT DOCUMENTS 3,984,711 A * 10/1976 Kordik .................. H02K 37/20
310/154.07
4,516,046 A * 5/1985 Mercier ................. H02K 23/04
310/154.11
(Continued)

FOREIGN PATENT DOCUMENTS

JP A-2008-43026 2/2008
JP A-2010-40823 2/2010
(Continued)

Primary Examiner — Thanh Lam
(74) Attorney, Agent, or Firm — Oliff PLC

(57) ABSTRACT

A stator of a rotary electric machine includes a stator core, coils and magnetic bodies. The stator core includes a plurality of teeth protruding towards the rotor and being spaced apart from each other and a plurality of slots arranged between two adjacent teeth. The coils are formed out of coil bodies being stacked in radial direction, thus the direction into which the teeth are extending, and are wound inside of slots around the teeth. The magnetic bodies are arranged between adjacent coil bodies. The thickness of the magnetic bodies in radial direction increases with increasing length of the tooth or with decreasing distance towards the air gap between rotor and stator.

3 Claims, 5 Drawing Sheets

(56) References Cited

U.S. PATENT DOCUMENTS

| | | | | |
|---|---|---|---|---|
| 6,242,834 B1 * | 6/2001 | Akemakou | ............ | H02K 19/24 310/162 |
| 6,262,508 B1 * | 7/2001 | Shibayama | ............ | H02K 21/00 310/152 |
| 7,868,506 B2 * | 1/2011 | Hoang | .................. | C23C 4/04 310/154.11 |
| 8,076,811 B2 * | 12/2011 | Zhu | .................. | H02K 21/44 310/154.11 |
| 2003/0122439 A1 * | 7/2003 | Horst | .................. | H02K 15/03 310/154.11 |
| 2011/0140817 A1 | 6/2011 | Fukaya et al. | | |

FOREIGN PATENT DOCUMENTS

| | | |
|---|---|---|
| JP | A-2010-81715 | 4/2010 |
| JP | A-2010-220387 | 9/2010 |
| JP | A-2012-80699 | 4/2012 |

* cited by examiner

STATOR OF A ROTARY ELECTRIC MACHINE

BACKGROUND OF THE INVENTION

1. Field of the Invention

The invention relates to stator of a rotary electric machine, that includes a stator core in which a plurality of teeth that protrude toward a rotor are arranged spaced apart from each other, and in which a slot is formed between the teeth, and a coil that passes through the slot and is wound around the teeth.

2. Description of Related Art

Japanese Patent Application Publication No. 2010-220387 (JP 2010-220387 A) describes a rotary electric machine in which a magnetic plate is inserted between coil wires that are stacked and wound in a concentrated winding around teeth of a stator. As a result, magnetic flux flows more easily to the magnetic plate, and is thus inhibited from flowing to the coil wires, which reduces an eddy current generated by a fluctuation in magnetic flux interlinked with the coil.

When magnetic flux that flows through the teeth of the stator becomes saturated when applying magnetic flux between the stator and the rotor, the magnetic flux leaks out from the teeth and flows out through the coil positioned between adjacent teeth (i.e., in the slot). The amount of leakage flux that flows through the coil between the teeth increases toward the tip end side of the teeth that is close to the rotor where the magnetic flux acts, and decreases toward the root (i.e., the base) side of the teeth that is farther away from the rotor. Also, when leakage flux that flows through the coil between the teeth fluctuates, an eddy current is generated in the coil, and loss resulting from this eddy current occurs. In particular, an eddy current due to fluctuation in the leakage flux that flows through the coil between the teeth tends to increase, and thus loss resulting from the eddy current also tends to increase, more in the coil positioned on the tip end side of the teeth that is close to the rotor.

The technology described in JP 2010-220387 A attempts to reduce an eddy current generated by a fluctuation in the magnetic flux that is interlinked with the coil, by facilitating the flow of leakage flux between the teeth to the magnetic plate inserted between the coil wires. However, the thickness of the magnetic plate inserted between the coil wires is constant from the tip end side of the teeth where the amount of leakage flux is large to the root side of the teeth where the amount of leakage flux is small. Therefore, the thickness (i.e., the width of the magnetic path) of the magnetic plate is excessive at the root side of the teeth. As a result, the conductor space factor between the teeth decreases.

SUMMARY OF THE INVENTION

The invention thus provides a stator of a rotary electric machine, that inhibits an eddy current from being generated in a coil due to fluctuation of leakage flux that flows between teeth, while preventing a decrease in the conductor space factor between the teeth.

The stator of a rotary electric machine according to the invention employs the means described below.

The invention relates to a stator of a rotary electric machine, that includes a stator core, a coil, and a magnetic body. The stator core includes a plurality of teeth and a plurality of slots. The teeth that protrude out toward a rotor are arranged spaced apart from one another, and the slot is arranged between the teeth. The coil is formed by coil bodies that are stacked, in a direction in which the teeth protrude, in the slot and wound around the teeth. The magnetic body is arranged between the coil bodies that are adjacent in the direction in which the teeth protrude, in the slot. A thickness of the magnetic body in the direction in which the teeth protrude becomes thicker as a distance to the rotor becomes shorter.

In the invention described above, the coil bodies may each include a conducting portion and an insulating portion that covers an outer periphery of the conducting portion. Also, a width of the magnetic body in a direction in which the teeth are arranged may be longer than a width of the conducting portion in the direction in which the teeth are arranged.

In the invention described above, the coil bodies may be arranged lined up in a row in the direction in which the teeth protrude, in the slot.

According to the invention, leakage flux between the teeth is able to be inhibited from flowing through the coil bodies, by flowing through the magnetic body. As a result, an eddy current is able to be inhibited from being generated in the coil bodies. Furthermore, the thickness of the magnetic body is a thickness according to the amount of leakage flux between the teeth, so the conductor space factor between the teeth is able to be prevented from decreasing.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
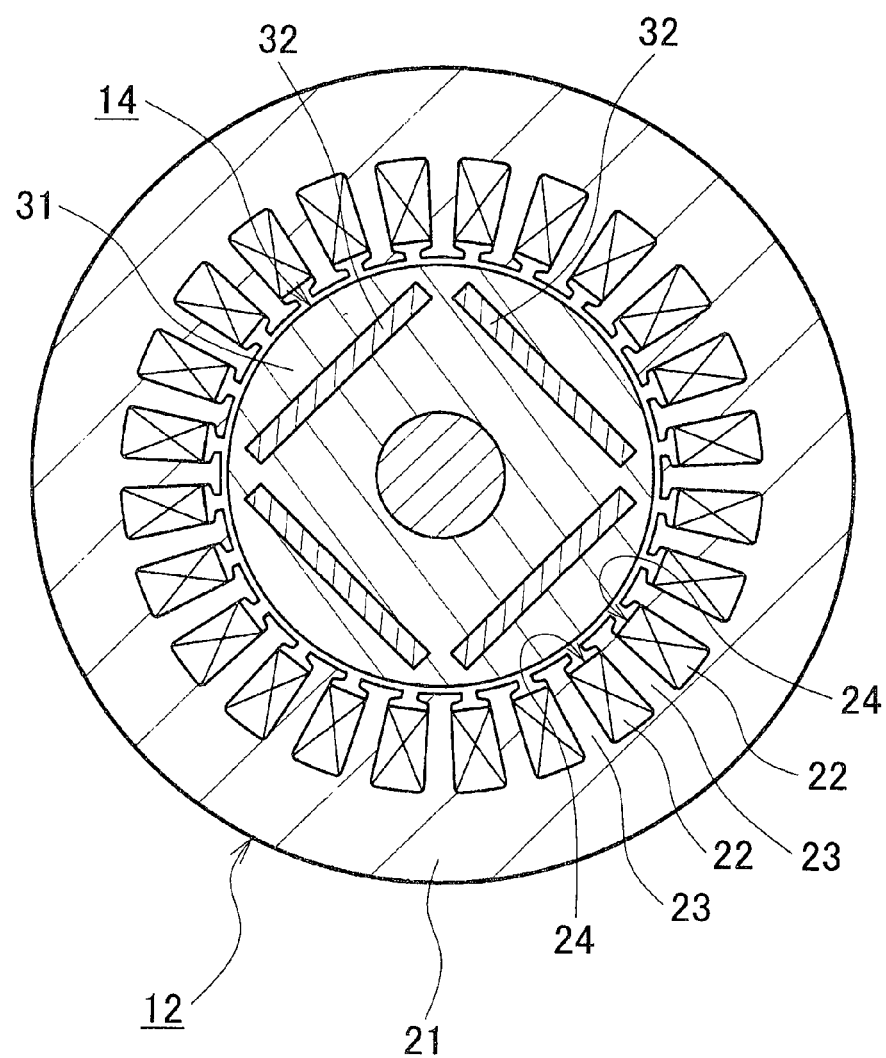
FIG. 1 is a sectional view schematically showing the structure of a stator and a rotor viewed from a rotor rotation axis direction.
Figure 2:
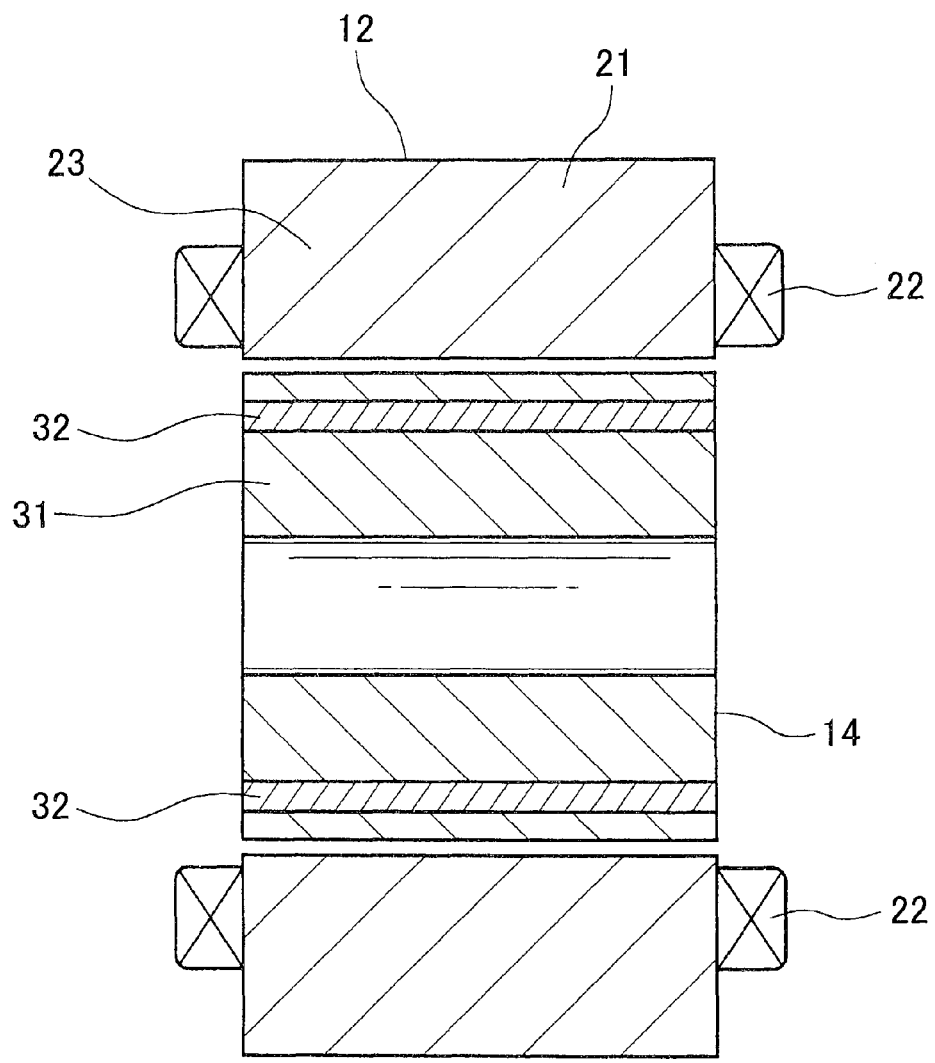
FIG. 2 is a sectional view schematically showing the structure of the stator and the rotor viewed from a direction orthogonal to the rotor rotation axis.
Figure 3:
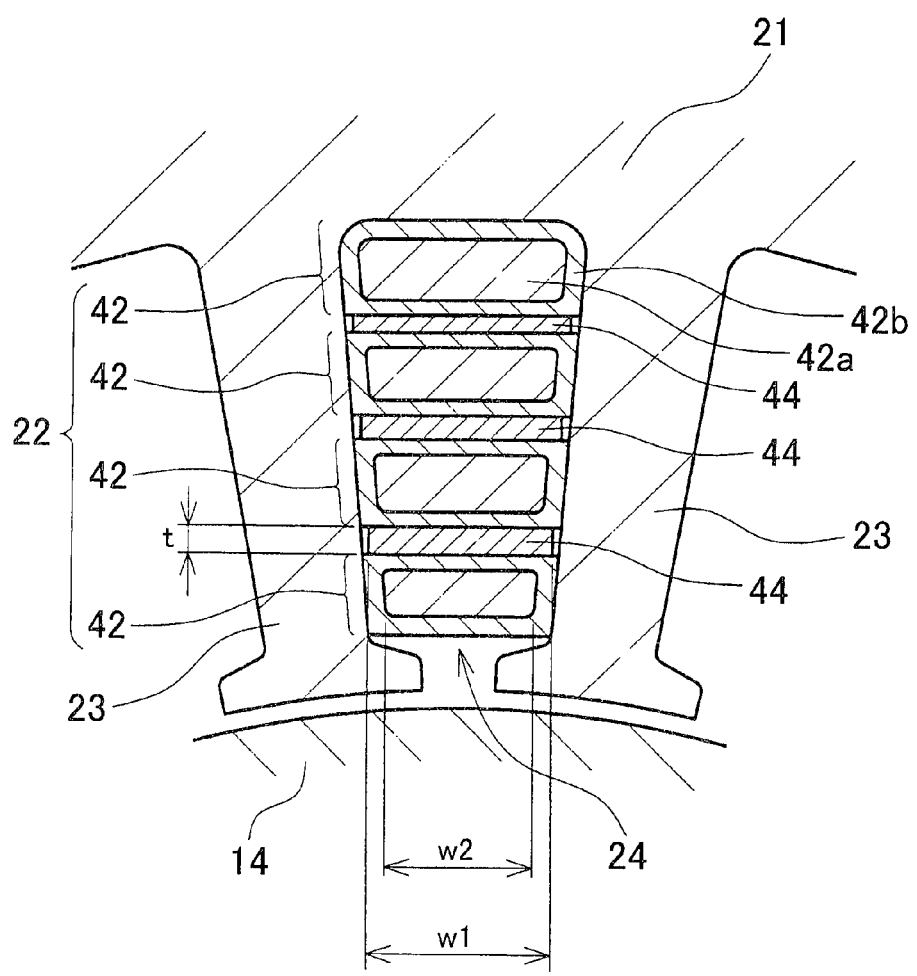
FIG. 3 is a sectional view schematically showing the structure of the stator according to an example embodiment of the invention, viewed from the rotor rotation axis direction.

Hereinafter, modes for carrying out the invention (hereinafter simply referred to as "example embodiments") will be described with reference to the accompanying drawings. FIGS. 1 to 3 are views schematically showing the structure of a rotary electric machine provided with a stator according to one example embodiment of the invention. FIG. 1 is a schematic diagram of the structure of a stator 12 and a rotor 14 viewed from a stator axis or rotor rotation axis (hereinafter simply referred to as "rotation axis") direction. FIG. 2 is a schematic diagram of the stator 12 and the rotor 14 viewed from a direction orthogonal to the rotation axis. FIG. 3 is a schematic diagram of the stator 12 viewed from the rotation axis direction. The rotary electric machine according to this example embodiment includes the stator 12 that is stationary (i.e., fixed so that it will not rotate), and the rotor 14 that is able to rotate relative to the stator 12. In the example shown in FIGS. 1 and 2, the stator 12 and the rotor 14 are arranged face-to-face across a predetermined small gap, in a radial direction orthogonal to the rotation axis. The rotor 14 is arranged on an inner peripheral side of the stator 12.

The rotor 14 includes a rotor core 31 and a plurality of permanent magnets 32 that are arranged in the rotor core 31 in the circumferential direction thereof. The stator 12 includes a stator core 21, and a coil 22 of a plurality of phases (such as three phases) arranged on the stator core 21. A plurality of teeth 23 that protrude radially inward toward the rotor 14 are arranged on the stator core 21 at intervals (i.e., equidistant intervals) in the circumferential direction around the rotation axis. Slots 24 are formed extending in the rotation axis direction between the teeth 23 that are adjacent in the circumferential direction. A slot 24 is arranged between the teeth of each pair of adjacent teeth. In the example shown in FIGS. 1 and 2, the direction in which the plurality of teeth 23 are arranged matches the circumferential direction, and the direction in which the slots 24 extend matches the rotation axis direction. Magnetic poles are formed on the stator 12 by the coil 22 being wound around the teeth 23 through the slots 24 between the teeth 23. The winding method is a distributed winding for example.

As shown in FIG. 3, the coil 22 is formed by stacking together, in a radial direction (i.e., the direction in which the teeth protrude), a plurality of coil bodies 42 that extend in the rotation axis direction inside the slots 24, and winding these coil bodies 42 around the teeth 23. In FIG. 3, the teeth 23 and the coil 22 are only partially shown in the circumferential direction, but the structure of the portion that is not shown may be realized by the same structure as that of the portion that is shown. Each of the coil bodies 42 includes a conductor line 42a, and an insulator layer 42b that covers an outer periphery of the conductor line 42a. In the example shown in FIG. 3, the coil bodies 42 are arranged lined up in a row in the radial direction inside the slot 24. In the example shown in FIG. 3, four layers of coil bodies 42 are lined up in the radial direction, but the number of coil bodies 42 that are lined up in the radial direction may be set as appropriate.

In this example embodiment, magnetic layers 44 through which magnetic flux is able to easily pass are arranged sandwiched between the coil bodies 42 that are adjacent in the radial direction (i.e., in the protruding direction of the teeth protrude), as shown in FIG. 3. These magnetic layers 44 correspond to a magnetic body of the invention. A thickness t of the magnetic layers 44 in the radial direction becomes gradually thicker from the magnetic layer 44 arranged on the radially outer side (i.e., the root side of the teeth) toward the magnetic layer 44 arranged on the radially inner side (i.e., the tip end side of the teeth). That is, the thickness t of the magnetic layers 44 in the radial direction (i.e., the protruding direction of the teeth) becomes thicker as the distance to the rotor 14 becomes shorter. Each magnetic layer 44 extends substantially across the slot 24 (i.e., between adjacent teeth 23) in the circumferential direction, with a small space between the teeth 23 and both ends of the magnetic layer 44 in the circumferential direction. A width w1 of the magnetic layer 44 in the circumferential direction (i.e., the direction in which the teeth are arranged) is longer than a width w2 of the conductor line 42a in the circumferential direction (i.e., the direction in which the teeth are arranged). The magnetic layers 44 are thin sheets and are formed from members separate from the coil bodies 42. However, the magnetic layers 44 may also be mounted on, or integrally formed with, a surface of the coil bodies 42 (i.e., the insulator layer 42b).

With the rotary electric machine, each of the teeth 23 is magnetized in order, such that a rotating magnetic field that rotates in the circumferential direction is formed in the stator 12, by flowing alternating current through the coil 22 of the plurality of phases (e.g., three phases). Also, electromagnetic interaction between the rotating magnetic field generated in the stator 12 and a field flux generated by the permanent magnets 32 of the rotor 14 applies torque (magnetic torque) to the rotor 14, which enables the rotor 14 to be rotatably driven. This electromagnetic interaction is attraction and repulsion. In this way, the rotary electric machine is able to be made to function as an electric motor that has the rotor 14 generate power using electric power supplied to the coil 22. On the other hand, the rotary electric machine is also able to be made to function as a generator that has the coil 22 generate electric power using the power of the rotor 14. Also, the rotor 14 is not limited to a structure provided with the permanent magnets 32. For example, the rotor 14 may also have a structure provided with a coil, or a structure that uses reluctance torque from a change in magnetic resistance.

Figure 4:
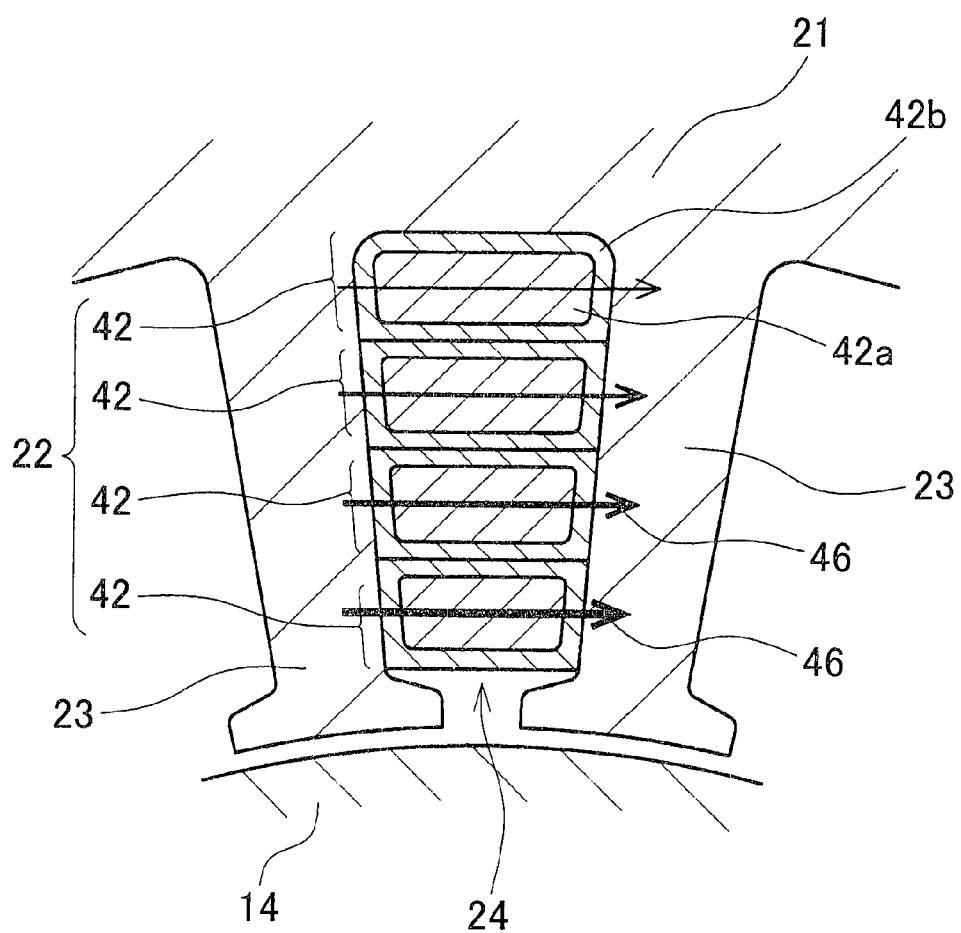
FIG. 4 is a view showing leakage flux generated between teeth of the stator.

When applying torque between the stator 12 and the rotor 14, magnetic flux acts between the stator 12 and the rotor 14, and this magnetic flux flows through the teeth 23 in the radial direction. However, when the magnetic flux that flows through the teeth 23 becomes saturated, magnetic flux leaks out from the teeth 23 and flows out between adjacent teeth 23 (i.e., through the slot 24) in the circumferential direction. In particular, when the torque of the rotor 14 is large, magnetic flux that flows through the teeth 23 tends to become saturated, so magnetic flux tends to flow between the teeth 23 in the circumferential direction. The amount of leakage flux that flows between the teeth 23 in the circumferential direction increases toward the radially inner side (i.e., the tip end side of the teeth) where the distance to the rotor 14 where the magnetic flux acts is close, and decreases toward the radially outer side (i.e., the root side of the teeth) farther away from the rotor 14. Here, as shown in FIG. 4, when considering a case in which the magnetic layers 44 are not provided, leakage flux 46 between the teeth 23 will flow through the coil bodies 42 (i.e., the conductor lines 42a) in the circumferential direction, and the amount of leakage flux will increase in the conductor lines 42a that are farther toward the radially inner side where the distance to the rotor 14 is closer. Also, when the leakage flux 46 that flows through the coil bodies 42 between the teeth 23 fluctuates, an eddy current will flow through the conductor lines 42a. As a result, loss will occur due to this eddy current. In particular, an eddy current from a fluctuation in the leakage flux 46 between the teeth 23 tends to be larger, and thus the loss from the eddy current tends to be greater, in conductor lines 42a that are farther toward the radially inner side where the distance to the rotor 14 is closer.

Figure 5:
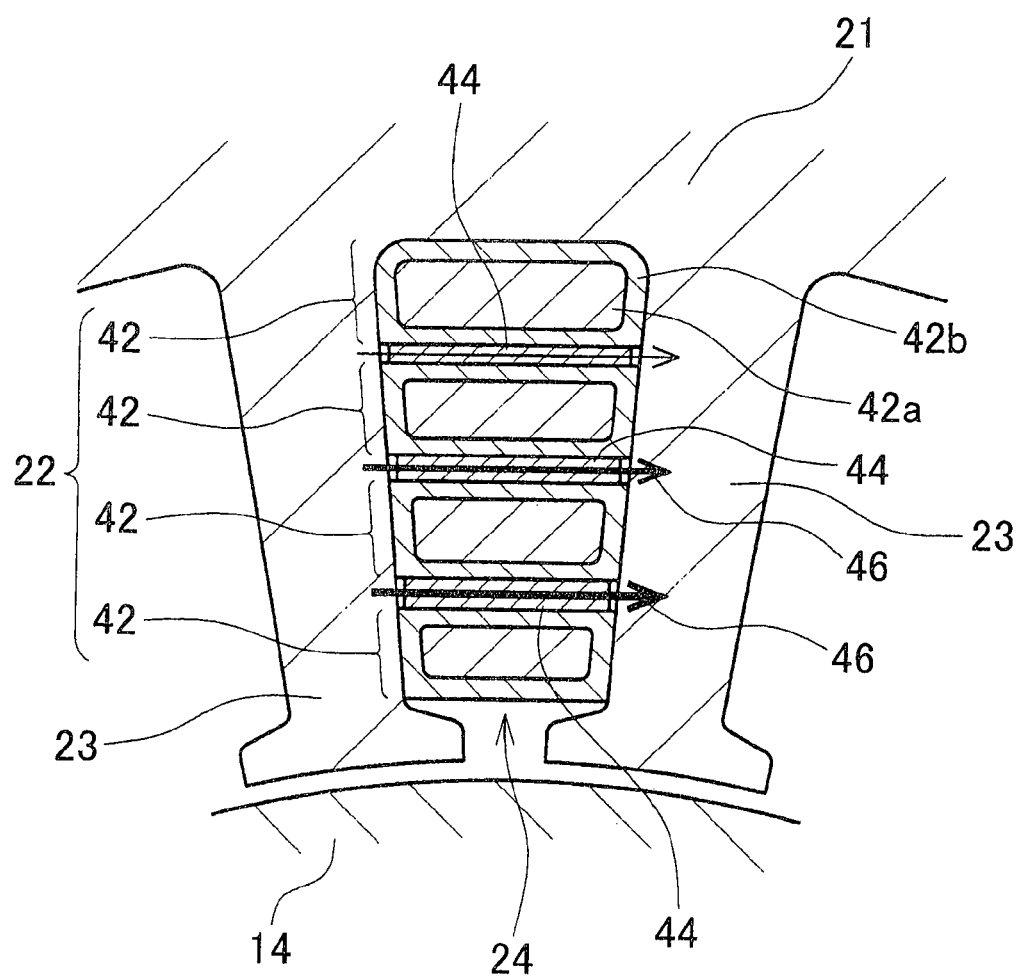
FIG. 5 is a view showing leakage flux generated between the teeth, in the stator according to the example embodiment of the invention.

In contrast, in this example embodiment, the magnetic layers 44 are arranged between coil turns (i.e., between coil bodies 42) in the slots 24, so the leakage flux 46 between the teeth 23 flows mainly through the magnetic layers 44 in the circumferential direction, as shown in FIG. 5. Furthermore, the thickness t of the magnetic layers 44 in the radial direction is thicker for the magnetic layers 44 that are farther toward the radially inner side where the distance to the rotor 14 is short and a large amount of leakage flux is generated. As a result, more of the leakage flux 46 flows through the magnetic layers 44 that are farther toward the radially inner side where a large amount of leakage flux is generated, and the leakage flux 46 that flows through the magnetic layers 44 becomes less farther toward the radially outer side where the leakage flux decreases. Therefore, leakage flux between the teeth 23 is able to be inhibited from flowing through the coil bodies 42 (i.e., the conductor lines 42a) from the tip end side of the teeth all the way to the root side of the teeth, so an eddy current can be inhibited from being generated in the conductor lines 42a from the tip end side of the teeth all to way to the root side of the teeth. As a result, loss due to the eddy current is able to be inhibited. Furthermore, the thickness of the magnetic layers 44 is a thickness according to the amount of leakage flux between the teeth 23, so the conductor space factor in the slot 24 is able to be prevented from decreasing.

Moreover, in this example embodiment, the width w1 of the magnetic layers 44 in the circumferential direction is longer than the width w2 of the conductor lines 42a in the circumferential direction, so leakage flux between the teeth 23 is able to more easily be made to flow through the magnetic layers 44.

Also, in this example embodiment, the coil bodies 42 are arranged lined up in a row in the radial direction, so the coil bodies 42 and the magnetic layers 44 are able to be arranged without gaps in between, which enables the conductor space factor in the slot 24 to be improved.

In the example embodiment described above, the magnetic layer 44 does not necessarily have to be arranged between all of the coil bodies 42 that are lined up in the radial direction. For example, the magnetic layer 44 may be arranged only between the coil bodies 42 on the radially inner side (i.e., on the tip end side of the teeth) where the distance to the rotor 14 is short, and the magnetic layer 44 may be omitted between the coil bodies 42 on the radially outer side (i.e., on the root side of the teeth) farther away from the rotor 14.

In the example embodiment described above, a case in which the coil 22 is wound around the teeth 23 in a distributed winding is described, but the coil 22 may also be wound around the teeth 23 by a winding method other than a distributed winding. For example, the coil 22 may also be wound around the teeth 23 in a concentrated winding.

In the example embodiment described above, a case in which the invention is applied to a radial type rotary electric machine is described, but the invention may also be applied to an axial type rotary electric machine.

While the invention has been described with reference to example embodiments thereof, it should be understood that the invention is not limited in any way to these example embodiments. That is, the invention may of course be carried out in modes that have been modified in any of a variety of ways without departing from the scope thereof.

The invention claimed is:

1. A stator of a rotary electric machine, comprising:
a stator core including a plurality of teeth and a plurality of slots, the teeth protruding out toward a rotor and being arranged spaced apart from one another, and the slots being arranged between the teeth;
a coil formed by coil bodies, the coil bodies being stacked, in a direction in which the teeth protrude, in the slot and being wound around the teeth; and
a magnetic body that is arranged between the coil bodies that are adjacent in the direction in which the teeth protrude, in the slot, a thickness of the magnetic body in the direction in which the teeth protrude being thicker as a distance to the rotor becomes shorter.

2. The stator according to claim 1, wherein the coil bodies each include a conducting portion and an insulating portion that covers an outer periphery of the conducting portion; and a width of the magnetic body in a direction in which the teeth are arranged is longer than a width of the conducting portion in the direction in which the teeth are arranged.

3. The stator according to claim 1, wherein the coil bodies are arranged lined up in a row in the direction in which the teeth protrude, in the slot.

\* \* \* \* \*